(12) United States Patent
McLean et al.

(10) Patent No.: US 9,004,008 B2
(45) Date of Patent: Apr. 14, 2015

(54) BIRDHOUSE

(75) Inventors: Steven E. McLean, Green Bay, WI (US); Brian J. Berggren, Green Bay, WI (US); Bradley N. Harder, Appleton, WI (US); Paul D. Dax, Green Bay, WI (US)

(73) Assignee: Wild Blue Technologies, Inc., De Pere, WI (US)

( * ) Notice: Subject to any disclaimer, the term of this patent is extended or adjusted under 35 U.S.C. 154(b) by 395 days.

(21) Appl. No.: 12/969,247

(22) Filed: Dec. 15, 2010

(65) Prior Publication Data

US 2012/0152178 A1    Jun. 21, 2012

(51) Int. Cl.
    *A01K 31/08*      (2006.01)

(52) U.S. Cl.
    CPC ..................... *A01K 31/08* (2013.01)

(58) Field of Classification Search
    USPC ......... 119/431, 428, 429, 430, 432, 433, 434, 119/435, 346; 220/4.32, 4.31, 4.28; 206/577, 223, 216; 47/66.3; D30/124, D30/110

See application file for complete search history.

(56) References Cited

U.S. PATENT DOCUMENTS

| | | | | |
|---|---|---|---|---|
| 2,915,040 A * | 12/1959 | Ward | | 119/431 |
| 3,053,226 A * | 9/1962 | Dunn | | 119/428 |
| 3,143,236 A * | 8/1964 | Haas | | 217/12 R |
| 3,195,507 A * | 7/1965 | Miller | | 119/431 |
| 3,478,722 A * | 11/1969 | Falcone, Jr. et al. | | 119/431 |
| 3,696,960 A * | 10/1972 | Smirle | | 220/23.4 |
| 4,192,562 A * | 3/1980 | Bishoff et al. | | 312/108 |
| 4,561,383 A | 12/1985 | Tidwell | | |
| 5,170,747 A * | 12/1992 | Strangio | | 119/428 |
| 5,186,123 A * | 2/1993 | Cuddy | | 119/434 |
| 5,740,762 A | 4/1998 | Bennett | | |
| 6,067,938 A | 5/2000 | O'Dell | | |
| 6,170,437 B1 * | 1/2001 | Jones | | 119/428 |
| 6,247,426 B1 | 6/2001 | Lawson et al. | | |
| 6,397,781 B1 * | 6/2002 | Bellington | | 119/431 |
| 6,460,485 B1 * | 10/2002 | Burg | | 119/431 |
| 6,516,750 B1 | 2/2003 | Heinzeroth | | |
| 6,595,378 B2 * | 7/2003 | Wang | | 211/189 |
| 7,272,874 B2 * | 9/2007 | Staab | | 27/1 |
| 2002/0174836 A1 * | 11/2002 | Rasmussen | | 119/346 |
| 2005/0132972 A1 * | 6/2005 | Scott et al. | | 119/431 |
| 2008/0236510 A1 * | 10/2008 | Silverman | | 119/479 |
| 2009/0302046 A1 * | 12/2009 | Roberts et al. | | 220/666 |
| 2010/0175630 A1 * | 7/2010 | Stetson | | 119/431 |

FOREIGN PATENT DOCUMENTS

WO    WO 2008070376 A2 *   10/2008   ............ A63H 33/16

* cited by examiner

*Primary Examiner* — Troy Chambers
*Assistant Examiner* — Joshua Huson
(74) *Attorney, Agent, or Firm* — Reinhart Boerner Van Deuren s.c.

(57) ABSTRACT

A birdhouse with a plurality of members configurable in a shipping configuration and an operative configuration. In the shipping configuration, the members are stacked in a configuration suitable for shipping. The members are configured to be reconfigured from the shipping configuration to the operative configuration easily and without the use of tools.

20 Claims, 5 Drawing Sheets

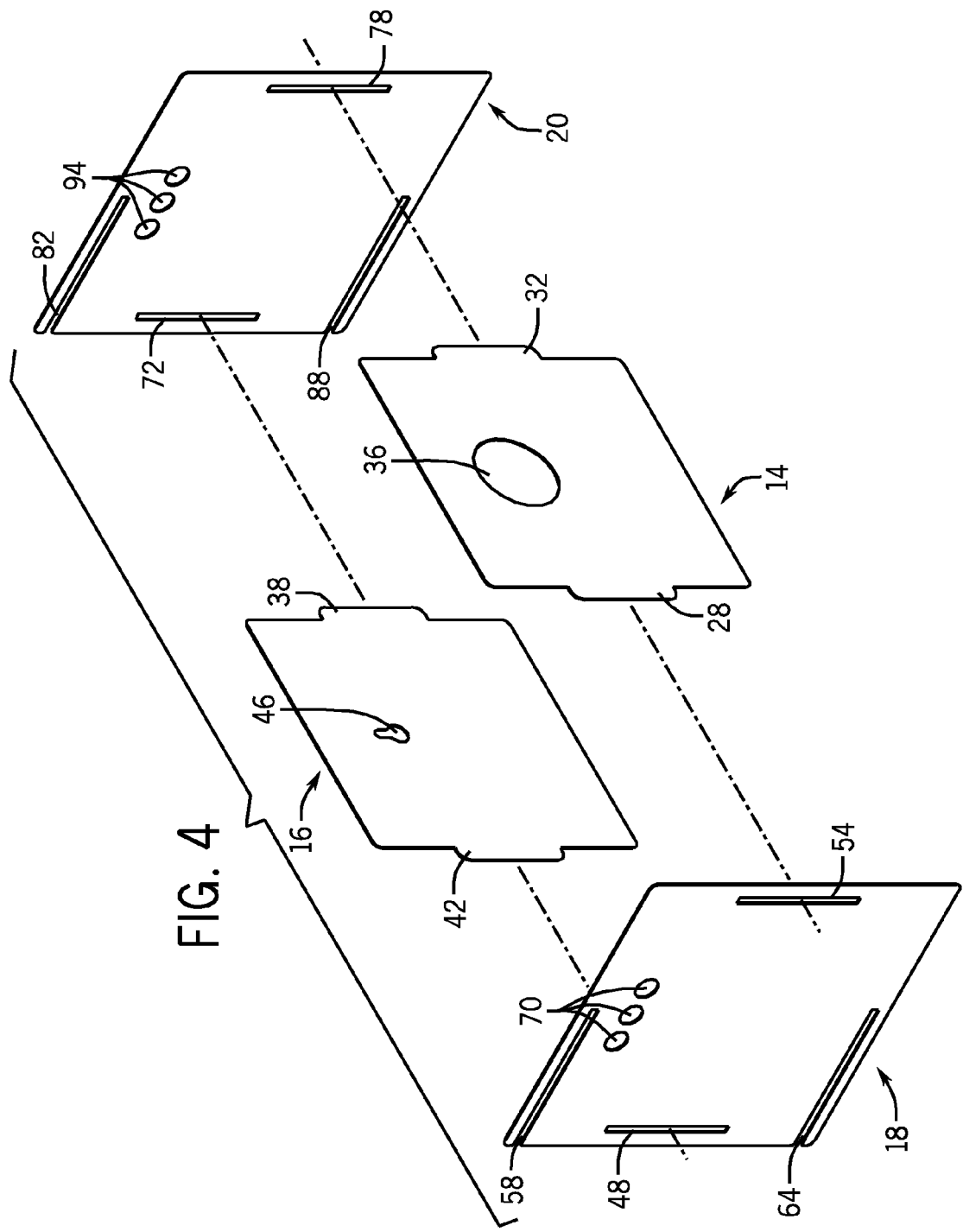

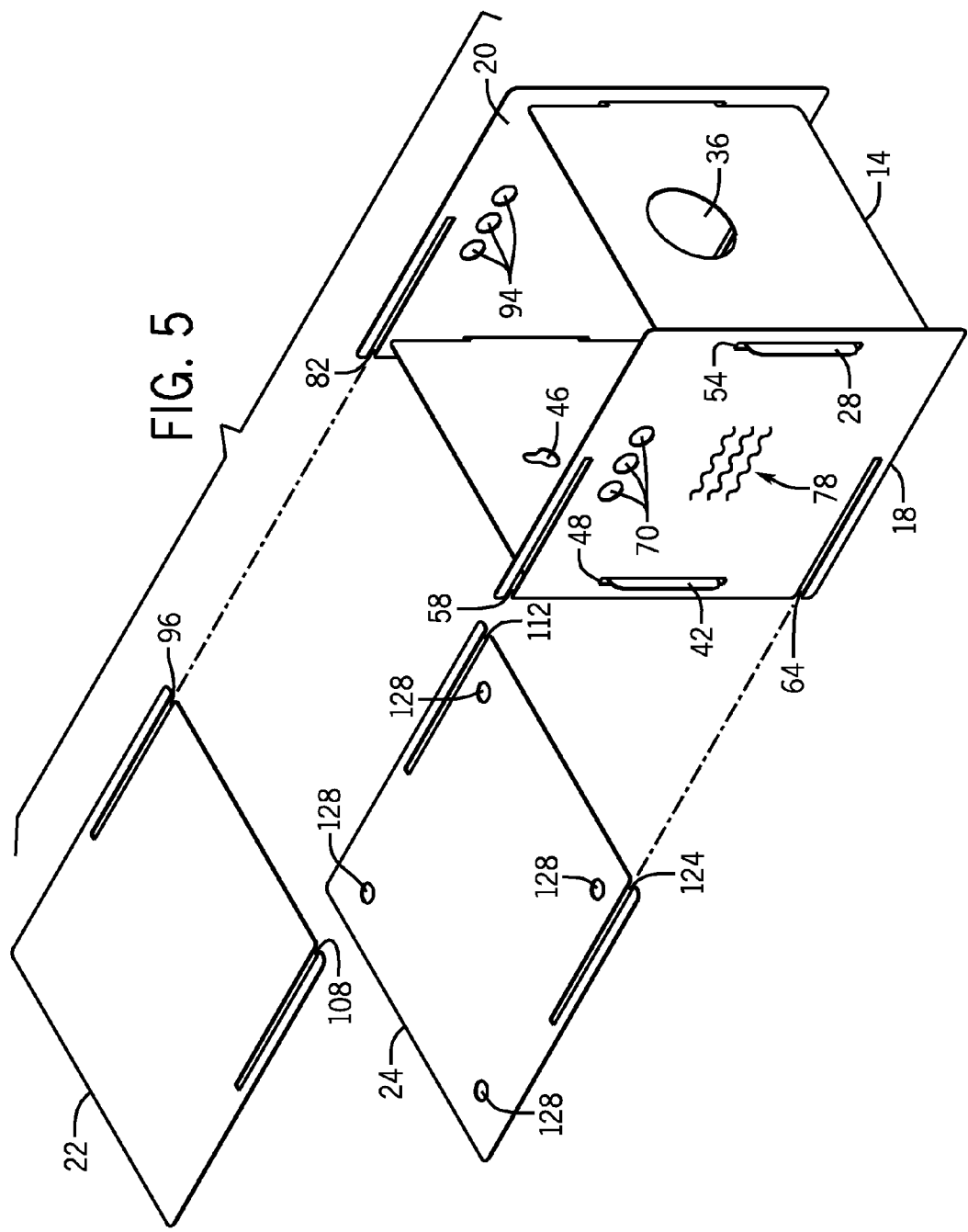

BIRDHOUSE

BACKGROUND OF THE INVENTION

Field of the Invention

The present invention relates generally to avian enclosures, and more particularly to avian enclosures with advantageous shipping qualities.

Because birdhouses may be placed in locations in which they are viewed by passersby, it is desirable that birdhouses be attractive to look at, as well as functional. Unfortunately, many people may not possess the time or the skill to make an attractive birdhouse. Thus, attractive birdhouses made by those with the time and skill to make such birdhouses may be purchased. However, because buyers and attractive birdhouse makers are often in different locations, the birdhouses must be shipped to the buyers.

Birdhouses are typically of shapes that are not conducive to efficient shipping. Thus, it would be advantageous to provide an attractive birdhouse that can be shipped efficiently.

It would further be advantageous to provide a birdhouse that upon shipping, could be placed in an operative configuration quickly and easily, and without the use of tools or adhesives.

The birdhouse of the present invention must also be of construction which is both durable and long lasting, and it should also require little or no maintenance to be provided by the user throughout its operating lifetime. In order to enhance the market appeal of the birdhouse of the present disclosure, it should also be of inexpensive construction to thereby afford it the broadest possible market. Finally, it is also an objective that the aforesaid advantages be achieved without incurring any substantial relative disadvantage.

SUMMARY OF THE INVENTION

The disadvantages and limitations of the background art discussed above are overcome by the present invention. With this invention, an attractive birdhouse, easily and efficiently shippable, and easily placed in an operative configuration without tools upon arrival, is provided.

A shippable birdhouse including a plurality of generally flat members having a shipping configuration and an operative configuration is provided. Each of the members is configured to couple to one or more other members in the operative configuration to define an enclosure. One of the members defines an entry/exit aperture. The members define a stack in the shipping configuration.

Additionally, a shippable birdhouse including a front member including an entry/exit aperture, a back member, a pair of side members, a top member, and a bottom member is provided. The members are reconfigurable into a six-sided birdhouse without the use of tools.

Additionally, each member includes at least one of a slot and a tab. At least one tab is configured to engage at least one slot, and at least one other slot is configured to engage another slot. The tabs and slots are engaged to form an operative configuration of the members. In a preferred embodiment, the shippable birdhouse also includes a packaging member configured to receive the top, bottom, front, back, and side members configured in a stack, wherein when the entire stack is contained within the packaging member a shipping configuration exists.

The birdhouse of the present disclosure is of a construction which is both durable and long lasting, and which will require little or no maintenance to be provided by the user throughout its operating lifetime. The birdhouse of the present disclosure is also of relatively inexpensive construction to enhance its market appeal and to thereby afford it the broadest possible market. Finally, all of the aforesaid advantages are achieved without incurring any substantial relative disadvantage.

DESCRIPTION OF THE DRAWINGS

These and other advantages of the present disclosure are best understood with reference to the drawings, in which:

FIG. 4 is an exploded view of the front, back, and side members of the birdhouse illustrated in FIGS. 1 through 3, showing these members as they are assembled into an operative assembly configuration by engaging the side members with the front and back members;

FIG. 5 is a partially exploded view having the assembled front, back, and side members of the birdhouse illustrated in FIG. 4 showing the top and bottom members as they are assembled into an operative configuration by engaging with the side members.

DETAILED DESCRIPTION OF THE EXEMPLARY EMBODIMENTS

An exemplary embodiment of a birdhouse with advantageous shipping qualities will be described with reference to the FIGS. 1 through 6.

Figure 1:
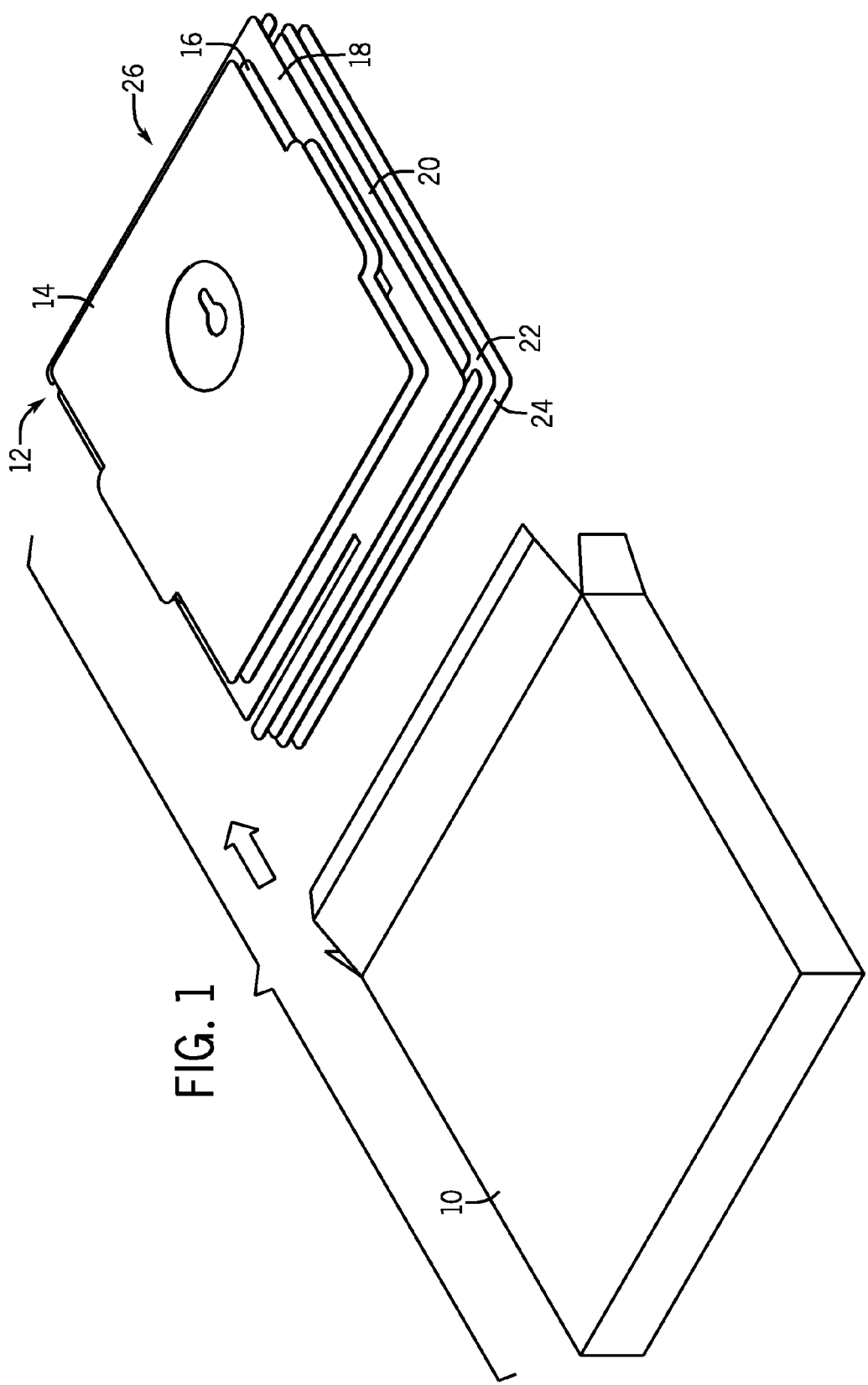
FIG. 1 is an exploded isometric view of an exemplary embodiment of a birdhouse in a shipping configuration being removed from a packaging member.

With reference to FIG. 1, a packaging member 10 configured for receiving and shipping a birdhouse having its members configured in a shipping configuration 12 within a packaging member 10 is illustrated. The birdhouse may be shipped in the shipping configuration 12, and can be slidably removed from the packaging member 10 upon arrival at a destination. The birdhouse includes a front member 14, a back member 16, a first side member 18, a second side member 20, a top member 22, and a bottom member 24. The members 14, 16, 18, 20, 22, 24 of the birdhouse may be shipped in a stacked configuration 26 overlying one another as shown in FIG. 1.

The packaging member 10 may be formed from cardboard, plastic, a combination of cardboard and plastic, or any other suitable material or combination of materials known in the art. The packaging member may be suitably sized based on the size of the members 14, 16, 18, 20, 22, and 24 of the birdhouse in the stacked configuration 26, and sized slightly longer than the longest member, slightly wider than the widest member, and slightly taller than the stacked configuration 26 of members 14, 16, 18, 20, 22, and 24. In one exemplary embodiment, the packaging member 10 for a shippable birdhouse may be approximately six and one-half inches by approximately seven and one-half inches by approximately three-quarters of an inch. Other suitable sizes are also envisioned.

Figure 2:
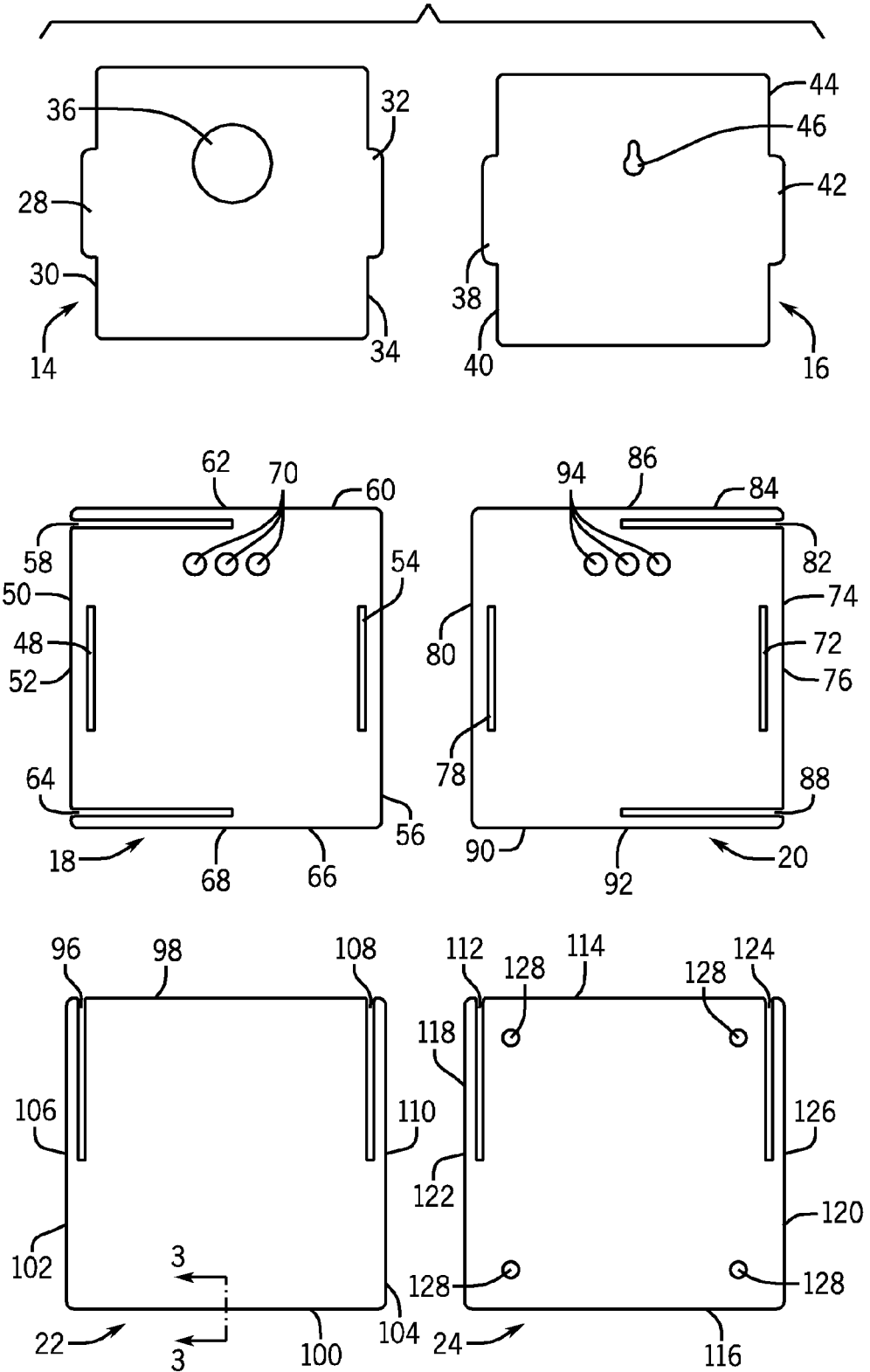
FIG. 2 is a plan view of the members of the birdhouse illustrated in FIG. 1.

With reference to FIG. 2, each of the members 14, 16, 18, 20, 22, and 24 of an embodiment of the birdhouse is illustrated. The front member 14 may be a generally rectangular sheet and includes a first tab 28 defined on and projecting outwardly from a first side 30 of the front member 14 and a second tab 32 defined on and projecting outwardly from a second side 34 that is opposite the first side 30. The front member 14 also defines an entry/exit aperture 36 configured to allow entry and/or exit of a bird. The entry/exit aperture 36 may be sized to allow various birds easy access to and exit from the interior of the birdhouse.

The back member 16 may be a generally rectangular sheet and includes a first tab 38 defined on and projecting from a first side 40 of the back member 16 and a second tab 42 defined on and projecting from an opposite side 44 from the first side 40. The back member 16 defines a hanging aperture 46 configured to receive a suitable hanging member, for example a hook, peg, screw, bolt, etc. (formed from, e.g., metal, plastic, wood, wire, filament, etc.) for hanging the birdhouse from a tree, branch, roof, pole, or any other suitable supporting member. The hanging aperture 46 may be defined in any suitable location in the back member 16.

The first side member 18 may be a generally rectangular sheet and defines a first slot 48 proximate a first side 50 of the first side member 18, extending parallel to the first side 50 and generally centered on the midpoint 52 of the first side 50. The first side member 18 also defines a second slot 54 defined generally parallel to and distal from the first slot 48, proximate a second side 56 of the first side member 18 opposite the first side 50. As will be discussed further below, the slots 48 and 54 are located and configured to interface and engage with the first tab 28 and the second tab 42, respectively.

The first side member 18 also defines a first open slot 58. The first open slot 58 extends from the first side 50 generally orthogonally to the first side 50 toward the second side 56. The first open slot 58 is defined proximate a third side 60 of the first side member 18, and extends generally parallel to the third side 60 towards the second side 56 and terminates proximate the midpoint 62 of the third side 60.

The first side member 18 also defines a second open slot 64 spaced apart from and generally parallel to the first open slot 58. The second open slot 64 extends from the first side 50 generally orthogonally to the first side 50 toward the second side 56. The second open slot 64 is defined proximate a fourth side 66 of the first side member 18, opposite the third side 60, and extends generally parallel to the fourth side 66 and towards the second side 56 and terminates proximate the midpoint 68 of the fourth side 66.

The first side member 18 also defines a plurality of venting apertures 70 proximate the third side 60 below the first open slot 58. The venting apertures 70 (for example, there may be three as shown) may be apertures defined proximate one another in a line generally parallel to the third side 60, and are configured to allow air flow between the interior and the exterior of the birdhouse in the operative configuration, also referred to as an enclosure 74 (see FIG. 6).

The second side member 20 may be a generally rectangular sheet and defines a first slot 72 proximate a first side 74 of the second side member 20, extending parallel to the first side 74 and generally centered on the midpoint 76 of the first side 74. The second side member 20 also defines a second slot 78 defined generally parallel to and distal from the first slot 72, proximate a second side 80 of the second side member 20 opposite the first side 74. As will be discussed further below, the slots 72 and 78 are located and sized to interface with the second tab 32 and the first tab 38, respectively.

The second side member 20 also defines a first open slot 82. The first open slot 82 extends from the first side 74 generally orthogonally to the first side 74 toward the second side 80. The first open slot 82 is defined proximate a third side 84 of the second side member 20, and extends generally parallel to the third side 84 towards the second side 80 and terminates proximate the midpoint 86 of the third side 84.

The second side member 20 also defines a second open slot 88 spaced apart from and generally parallel to the first open slot 82. The second open slot 88 extends from the first side 74 generally orthogonally to the first side 74 toward the second side 80. The second open slot 88 is defined proximate a fourth side 90 of the second side member 20, opposite the third side 84, and extends generally parallel to the fourth side 90, towards the second side 80 and terminates proximate the midpoint 92 of the fourth side 90.

The second side member 20 also defines a plurality of venting apertures 94 proximate the third side 84 below the first open slot 82. The venting apertures 94 (for example, there may be three as shown) may be apertures defined proximate one another in a line generally parallel to the third side 84, and are configured to allow air flow between the interior and the exterior of the birdhouse in the operative configuration, (the enclosure 74 shown in FIG. 6).

The top member 22 may also be a generally rectangular sheet. The top member 22 defines a first open slot 96 extending generally orthogonally from a first side 98 of the top member 22 toward a second side 100 opposite the first side 98. The first open slot 96 is located generally proximate and parallel to a third side 102 of the top member 22 and distal from a fourth side 104 opposite the third side 102. The first open slot 96 terminates proximate the midpoint 106 of the third side 102.

The top member 22 also defines a second open slot 108 extending generally orthogonally from the first side 98 of the top member 22 toward the second side 100. The second open slot 108 is located generally proximate and parallel to the fourth side 104 and distal from the third side 102. The second open slot 108 terminates proximate the midpoint 110 of the fourth side 104.

The bottom member 24 may also be a generally rectangular sheet. The bottom member 24 defines a first open slot 112 extending generally orthogonally from a first side 114 of the bottom member 24 toward a second side 116 opposite the first side 114. The first open slot 112 is located generally proximate and parallel to a third side 118 of the bottom member 24 and distal from a fourth side 120 opposite the third side 118. The first open slot 112 terminates proximate the midpoint 122 of the third side 118.

The bottom member 24 also defines a second open slot 124 extending generally orthogonally from the first side 114 of the bottom member 24 toward the second side 116. The second open slot 124 is located generally proximate and parallel to the fourth side 120 and distal from the third side 118. The second open slot 124 terminates proximate the midpoint 126 of the fourth side 120.

The bottom member 24 further defines four drain apertures 128 with one each located roughly proximate one of the four corners of the generally rectangular bottom member 24, although various other suitable numbers and configurations of drain apertures 128 are also envisioned. The drain apertures 128 are arranged and configured to allow bird feces, leftover food, dirt, and other contaminants to drain from the birdhouse and to allow for drainage of water from rain or from cleaning from the birdhouse.

Figure 3:
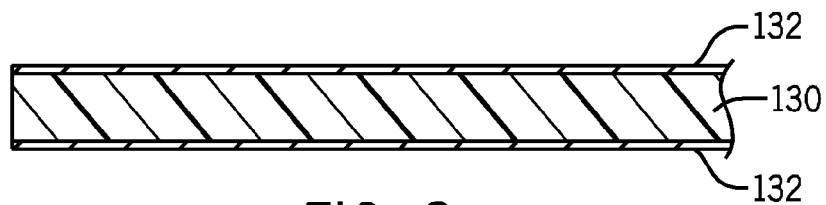
FIG. 3 is a cross-sectional view of a portion of a member of the birdhouse illustrated in FIGS. 1 and 2, taken along line 3-3 of FIG. 2

As is illustrated in FIG. 3, in one exemplary embodiment, each of the members 14, 16, 18, 20, 22, and 24 may be formed from an aluminum-plastic composite material (such as, for example, the material marketed by Alcan Composites USA Inc. under the registered trademark DIBOND) which includes a center extruded polyethylene layer 130 sandwiched between two layers of sheet aluminum 132. It is also contemplated that members 14, 16, 18, 20, 22, and 24 may instead be constructed of various other materials of suitable strength, durability and compatibility. Additionally, in one embodiment, indicia 78 (see, for example, FIGS. 5 and 6), including words, pictures, advertising, artwork, etc., may be affixed to or printed on the outer side of some or all of the members 14, 16, 18, 20, 22, and 24, which indicia 78 will be visible when the birdhouse is assembled into an operative configuration.

With reference to FIGS. 4 and 5, assembly of the members 14, 16, 18, 20, 22, and 24 into an operative configuration 134 (see, for example, FIG. 6) will be further described. First, as illustrated in FIG. 4, the front member 14 and the back member 16 are spaced apart and aligned generally parallel to each other. The first side member 18 is configured generally orthogonally to the front member 14 and the back member 16 and is positioned such that the first tab 28 of the front member 14 is aligned with the second slot 54 of the first side member 18 and the second tab 42 of the back member 16 is aligned with the first slot 48 of the first side member 18. The tabs 28 and 42 engage the slots 54 and 48, respectively, thereby coupling the front member 14 and the back member 16 in spaced-apart relation to the first side member 18.

The second side member 20 is configured such that the first slot 72 of the second side member 20 is positioned to receive the first tab 38 of the back member 16 and the second slot 78 of the second side member 20 is configured to receive the second tab 32 of the front member 14. Thus, the second side member 20 will be configured generally parallel to the first side member 18 and generally orthogonally to the front member 14 and the back member 16 when in an operative configuration 134 (see FIG. 6).

With reference to FIG. 5, the top member 22 is configured in a plane generally orthogonal to the front member 14, the back member 16, the first side member 18, and the second side member 20. The first open slot 96 is positioned to engage the first open slot 82 of the second side member 20, and the second open slot 108 configured to engage the first open slot 58 of the first side member 18. Thus, the top member 22 is slidably received by the first and second side members 18 and 20, closing one portion of an opening defined by the front member 14, the back member 16, the first side member 18, and the second side member 20, wherein the top of the operative configuration 134 of the birdhouse (see FIG. 6) is defined.

With further reference to FIG. 5, the bottom member 24 is configured spaced apart from and generally parallel to the top member 22 and in a plane generally orthogonal to the front member 14, the back member 16, the first side member 18, and the second side member 20. The first open slot 112 of the bottom member 24 is positioned to engage the second open slot 88 of the second side member 20 and the second open slot 124 is configured to engage the second open slot 64 of the first side member 18. Thus, the bottom member 24 is slidably received by the first and second side members 18 and 20, closing another portion of the opening defined by the front member 14, the back member 16, the first side member 18, and the second side member 20, wherein the closed bottom of the operative configuration 134 of the birdhouse (see FIG. 6) is defined.

Figure 6:
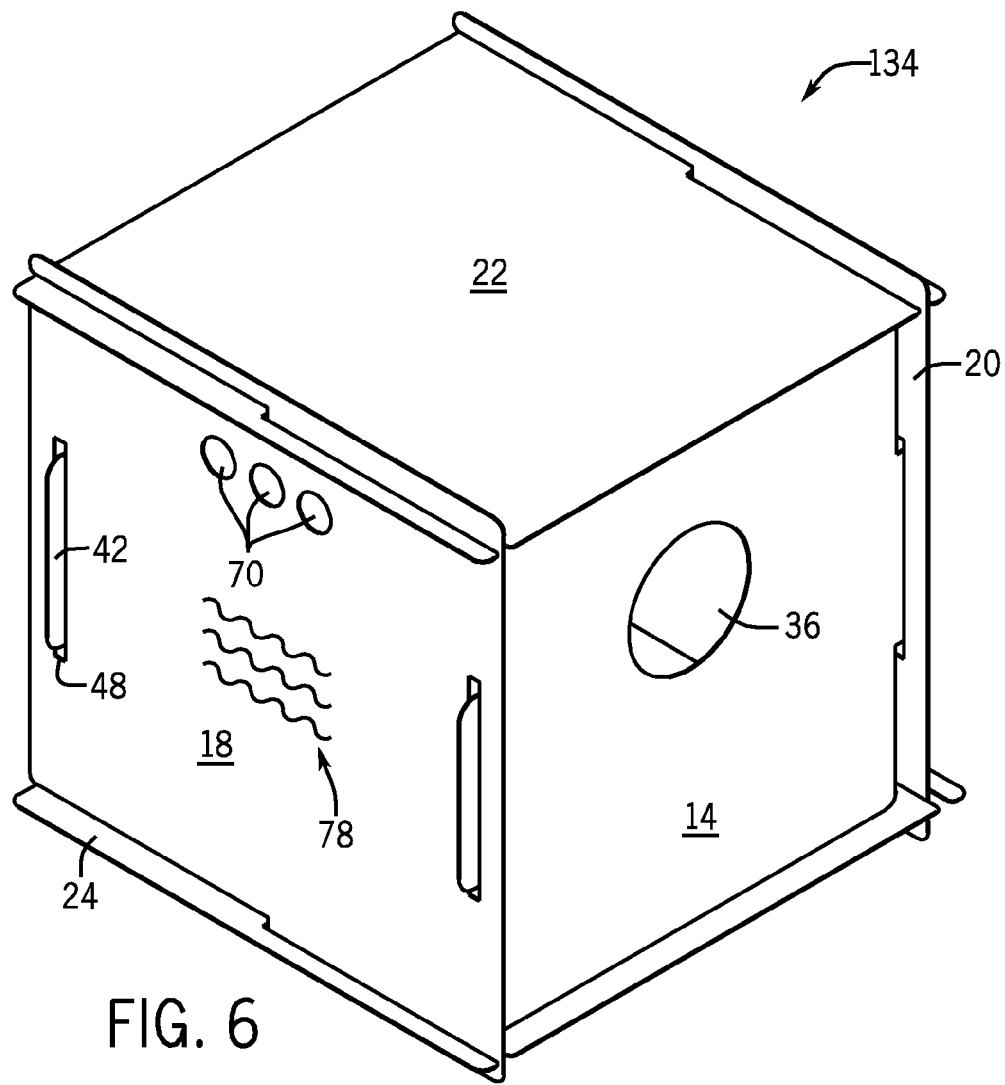
FIG. 6 is an isometric view of the birdhouse illustrated in FIGS. 1 through 5 fully assembled into an operative configuration.

Referring finally to FIG. 6, the birdhouse is illustrated in its operative configuration 134. In contrast to the shipping configuration of the stack 12 of the members 14, 16, 18, 20, 22, and 24, which is compact and well-suited for shipping, the birdhouse in its operative configuration 134 is suitable for placement in a location accessible by birds and for use by the same. As is described above, in one embodiment, the change from the shipping configuration 12 to the operative configuration 134 is easy and quick, and is accomplished without the use of tools or adhesives.

Although the members are described above as generally rectangular, various other suitable shapes and configurations for each of the members are also envisioned. For purposes of this application the phrase "generally rectangular" shall mean a shape having two sets of generally parallel sides with each set of sides being generally equal in length. However, the sides may include other features, such as, for example, canting, dovetailing, etc.

The members 14, 16, 18, 20, 22, and 24 may be generally flat and planar, however it is contemplated that the members may define configurations other than flat and planar, for example a bulge, a boule, or a dome portion.

Although various of the members define tabs and slots, it is envisioned that the members that define tabs could instead define slots and the members that define slots could include tabs. The tabs and slots may be interference fit to one another or coupled in any other suitable manner known in the art. Additionally, various other suitable methods of coupling the members to one another are also envisioned.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the shippable birdhouse of the present invention has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the invention as described herein may be made, none of which depart from the spirit or scope of the present disclosure. The particular embodiments and applications were chosen and described to provide the best illustration of the principles of the invention and its practical application to thereby enable one of ordinary skill in the art to utilize the disclosure in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:
1. A shippable birdhouse comprising:
 first and second generally flat rectangular members each having tabs extending from two opposite sides thereof;
 third and fourth generally flat rectangular members each having slots located adjacent two opposite sides thereof;
 wherein the first, second, third, and fourth rectangular members are arranged and configured to facilitate installation of one of the tabs of each of the first and second members into one of the slots in the third rectangular member and one of the tabs of each of the first and second members into one of the slots in the fourth rectangular member to thereby define a four-sided configuration;

a pair of open slots located in each of the third and fourth rectangular members respectively adjacent top and bottom edges of the third and fourth rectangular members, wherein the open slots adjacent the top edges of the third and fourth rectangular members are arranged in the four-sided configuration to be oriented in the same direction, and wherein the open slots adjacent the bottom edges of the third and fourth rectangular members are arranged in the four-sided configuration to be oriented in the same direction; and top and bottom rectangular members each having a pair of open slots located therein respectively adjacent opposite side edges of the top and bottom rectangular members, the pair of open slots in the top and bottom rectangular members being open at the same side of each of the top and bottom rectangular members;

wherein the pair of open slots located in the bottom rectangular member and the open slots adjacent the bottom edges of the third and fourth rectangular members are arranged and configured to interlock to retain the bottom rectangular member on the four-sided configuration;

wherein the pair of open slots located in the top rectangular member and the open slots adjacent the top edges of the third and fourth rectangular members are arranged and configured to interlock to retain the top rectangular member on the four-sided configuration; and wherein one of the first, second, third, and fourth rectangular members has an entry/exit aperture located therein; and wherein the first, second, third, and fourth rectangular members together with the top and bottom rectangular members are configured to collectively define a stack in a shipping configuration.

2. The birdhouse of claim 1, further comprising:
a packaging member configured to enclose the stack when the stack is configured in the shipping configuration.

3. The birdhouse of claim 2, further comprising:
a plurality of vents defined in each of the third and fourth rectangular members.

4. The birdhouse of claim 1, wherein at least one of the first, second, third, and fourth rectangular members and the top and bottom rectangular members further includes indicia visible when the stack is configured in the operative configuration.

5. The birdhouse of claim 4, wherein the indicia includes artwork located upon at least one of the first, second, third, and fourth rectangular members and the top and bottom rectangular members.

6. The birdhouse of claim 1, wherein each of the first, second, third, and fourth rectangular members and the top and bottom rectangular members is configured to couple to at least two other ones of the first, second, third, and fourth rectangular members and the top and bottom rectangular members without the use of tools or adhesives.

7. The birdhouse of claim 1, wherein the first, second, third, and fourth rectangular members and the top and bottom rectangular members are made of an aluminum-plastic composite material.

8. A shippable birdhouse comprising:
a compact stack of rectangular members including:
a front member having a tab extending from first and second opposite sides thereof, the front member also having an entry/exit aperture located therein;
a back member having a tab extending from first and second opposite sides thereof;
a first side member having a slot located adjacent a front edge thereof and a slot located adjacent a rear edge thereof, wherein the tab extending from the first side of the front member is configured to engage the slot adjacent the front edge of the first side member and the tab extending from the second side of the front member is configured to engage the slot adjacent the front edge of the second side member;
a second side member having a slot located adjacent a front edge thereof and a slot located adjacent a rear edge thereof, wherein the tab extending from the first side of the rear member is configured to engage the slot adjacent the rear edge of the first side member and the tab extending from the second side of the rear member is configured to engage the slot adjacent the rear edge of the second side member;

wherein the first and second side members each have a first open slot located therein respectively adjacent top sides of the first and second side members, the first open slots adjacent the top sides of the first and second side members both being open either at the front edges thereof or at the rear edges thereof;

wherein the first and second side members each have a second open slot located therein respectively adjacent bottom sides of the first and second side members, the second open slots adjacent the bottom sides of the first and second side members both being open either at the front edges thereof or at the rear edges thereof;

a top member having a pair of open slots located therein respectively adjacent opposite side edges of the top member, the pair of open slots in the top member being open at the same side of the top member; and a bottom member having a pair of open slots located therein respectively adjacent opposite side edges of the bottom member, the pair of open slots in the bottom member being open at the same side of the bottom member;

wherein the slots of the top member may be interlocked with first open slots located adjacent top sides of the first and second side members to retain the top member on the first and second side members and above the front and rear members without the use of tools; and wherein the slots of the bottom members may be interlocked with second open slots located adjacent bottom sides of the first and second side members to retain the bottom member on the first and second side members and below the front and rear members without the use of tools.

9. The shippable birdhouse of claim 8, further comprising:
a packaging member configured to enclose the compact stack of rectangular members.

10. The shippable birdhouse of claim 9, further comprising:
a plurality of vents defined in each of the first and second side members.

11. The shippable birdhouse of claim 8, wherein the back members has a hanging aperture located therein.

12. The shippable birdhouse of claim 8, wherein at least the first and second side members and the front and back members include artwork printed on a surface of each of the first and second side members and the front and back members.

13. The shippable birdhouse of claim 8, wherein the first open slots and the second open slots in the first and second side members are all open above one of the front and back members.

14. The shippable birdhouse of claim 8, wherein the tabs extending from first and second opposite sides of the front and rear members are each centrally located in the first and second opposite sides of the front member and said rear members; and wherein the slots located adjacent the front and rear edges of the first and second side members are centrally located adjacent the front and rear edges of the first and second side members.

15. The birdhouse of claim 8, wherein the first and second side members, the front and back members, and the top and bottom members are made of an aluminum-plastic composite material.

16. A shippable birdhouse comprising:
a first pair of opposite flat generally rectangular members each member having a pair of tabs, each tab extending from an opposite side thereof;
a second pair of opposite flat rectangular members each member having a pair of slots, each slot located proximate an opposite side thereof;
wherein the first and second pairs of rectangular members are configured to be assembled into a four-sided configuration with each tab of one of the first pair of rectangular members engaging a slot in one of the second pair of rectangular members;
top and bottom flat rectangular members each having a pair of open slots located adjacent opposite sides of the top and bottom rectangular members and open on a single side of the top and bottom flat rectangular members, with the open slots in the top and bottom flat rectangular members each being configured to engage respectively located in each of the second pair of flat rectangular members adjacent top and bottom edges thereof;
wherein the first and second pairs of rectangular members and the top and bottom rectangular members may be engaged to form an operative configuration of the birdhouse; and
wherein the various tabs and slots of the first and second pairs of rectangular members and the top and bottom rectangular members may be disengaged and the first and second pairs of rectangular members and the top and bottom rectangular members may be configured into a stack to form a shipping configuration of the birdhouse, wherein the shippable birdhouse additionally comprises:
a flat packaging member configured to receive the first and second pairs of rectangular members and the top and bottom rectangular members when they are configured in the stack when the stack is placed into the packaging member.

17. The shippable birdhouse of claim 16, further comprising:
a plurality of vents defined in each of the second pair of rectangular members.

18. The shippable birdhouse of claim 16, further comprising:
an entry/exit aperture located in one of the first pair of generally rectangular members.

19. The shippable birdhouse of claim 16, further comprising:
a hanging aperture located in one of the first pair of generally rectangular members.

20. The shippable birdhouse of claim 16, wherein at least one of the first and second pairs of rectangular members and the top and bottom rectangular members includes indicia located thereupon.

* * * * *